Patented Jan. 5, 1943

2,307,701

UNITED STATES PATENT OFFICE 2,307,701

CYCLO-HEXYLIDENE ETHYL CYANOACETATE AS AN INSECTICIDE

William Moore, Stamford, Conn., assignor to American Cyanamid Company, New York, N. Y., a corporation of Maine No Drawing. Application March 7, 1941, Serial No. 382,171

1 Claim. (Cl. 167—30)

The present invention relates to a pest-control agent and more particularly to a compound which is especially effective as a contact poison for the control of insects and allied pests.

I have discovered that cyclohexylidene ethyl cyanoacetate possesses strong insecticidal activity against sucking and soft-bodied insects which are particularly difficult to exterminate, for example the citrus red spider, *Tetranychus citri*, and the bean aphid, *Aphis rumicis*.

The following example illustrates a specific method of preparing the above compound in accordance with the invention. Materials employed are in parts by weight.

Example

A mixture consisting of 46 parts of ethyl cyanoacetate, 40 parts of cyclohexanone and one parts of piperidine (catalyst) was allowed to stand for 12 hours in a closed vessel at room temperature (20° C.). Considerable water had separated at the end of this period. The mixture was then heated for two hours upon a steam bath. The reaction product was dissolved in ether, washed neutral (0.05% $H_2SO_4$), dried over sodium sulfate and distilled at reduced pressure. The cyclohexylidene ethyl cyanoacetate was recovered as a colorless liquid boiling at 121° C. at less than 1 mm. pressure.

Spray solutions were prepared by dissolving the cyclohexylidene ethyl cyanoacetate in a solvent medium consisting of 65% acetone and 35% water. A 99.4% control was obtained when a spray of 1-1000 dilution was used against the citrus red spider, *Tetranychus citri*. At a dilution of 1-500, the insecticide gave a 91% control on the bean aphid, *Aphis remicis*.

Although the compound of this invention is especially effective as a contact poison for the control of insect pests, it may also be used for fungicidal and bactericidal purposes.

This new insecticide may be applied in any of the conventional manners. Thus, for example, it may be used in an aqueous emulsion or incorporated in organic liquids such as the aliphatic and aromatic hydrocarbons for spraying purposes, or it may be effectively used in dusts with such inert solid diluents as kieselguhr, wood flour, walnut shell, talc, and the like.

While the invention has been described with particular reference to specific embodiments, it is to be understood that it is not to be limited thereto but is to be broadly construed and restricted solely by the scope of the appended claim.

I claim:

An insecticide containing as an active ingredient cyclohexylidene ethyl cyanoacetate.

WILLIAM MOORE.